Sept. 19, 1944.  W. B. KLEMPERER  2,358,646
STEREOSCOPIC RANGE FINDER WITH VERTICAL BASE
Filed April 7, 1942   3 Sheets-Sheet 2
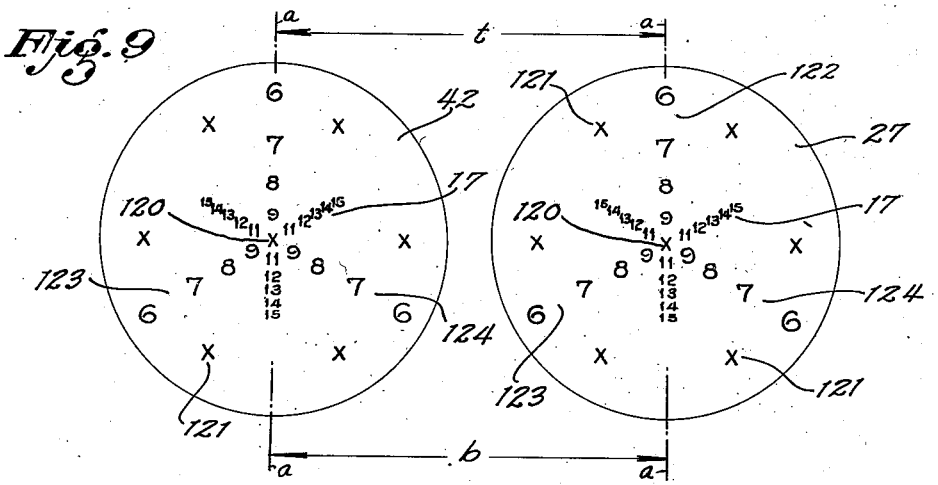
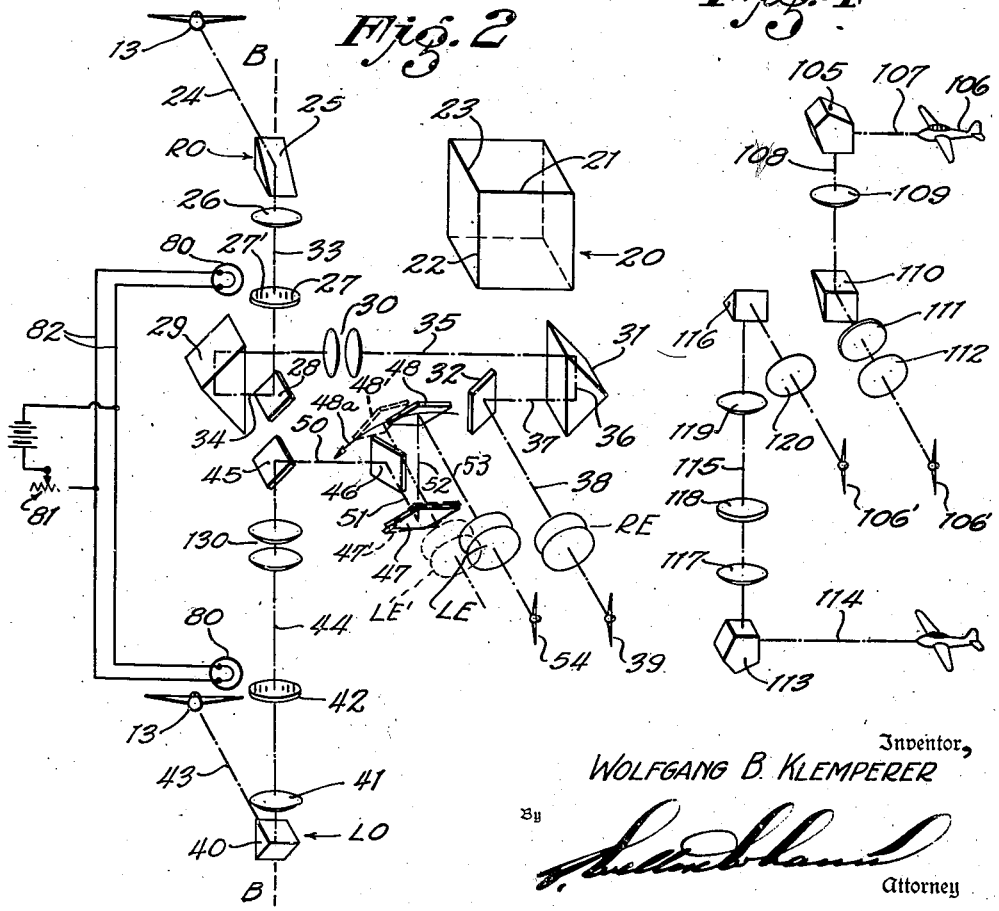
Inventor,
WOLFGANG B. KLEMPERER
By
Attorney Sept. 19, 1944.   W. B. KLEMPERER   2,358,646
STEREOSCOPIC RANGE FINDER WITH VERTICAL BASE
Filed April 7, 1942   3 Sheets-Sheet 3
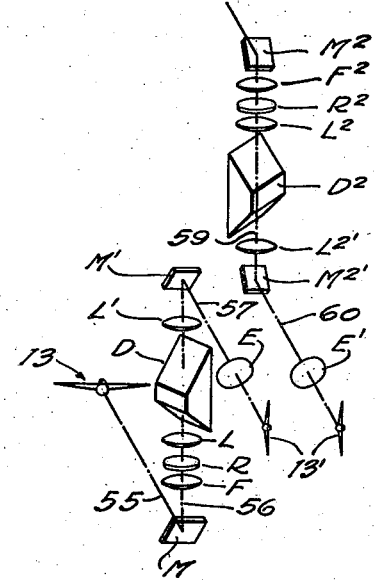
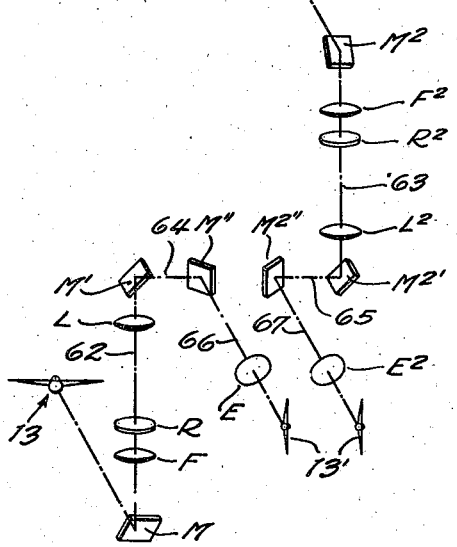
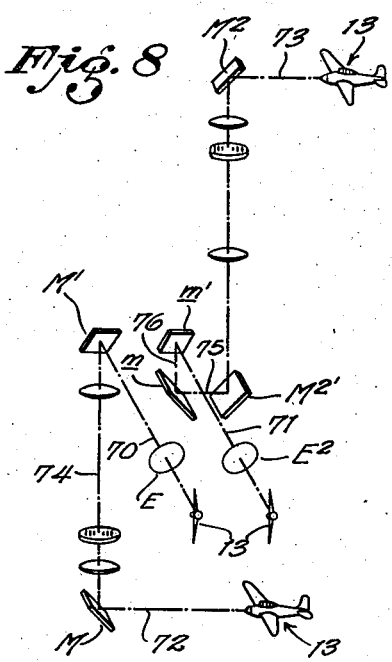
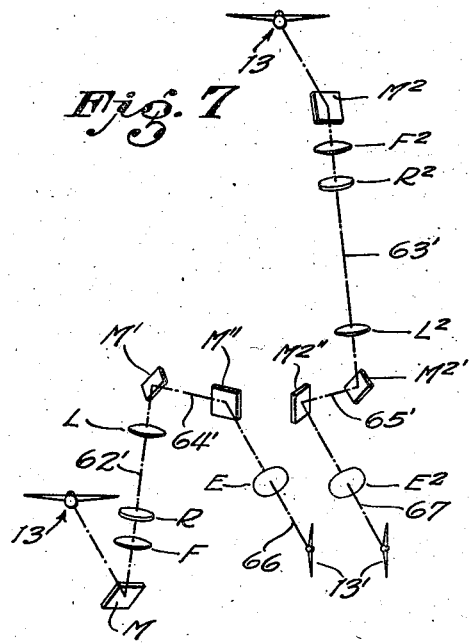
Inventor,
WOLFGANG B. KLEMPERER
By
Attorney Patented Sept. 19, 1944

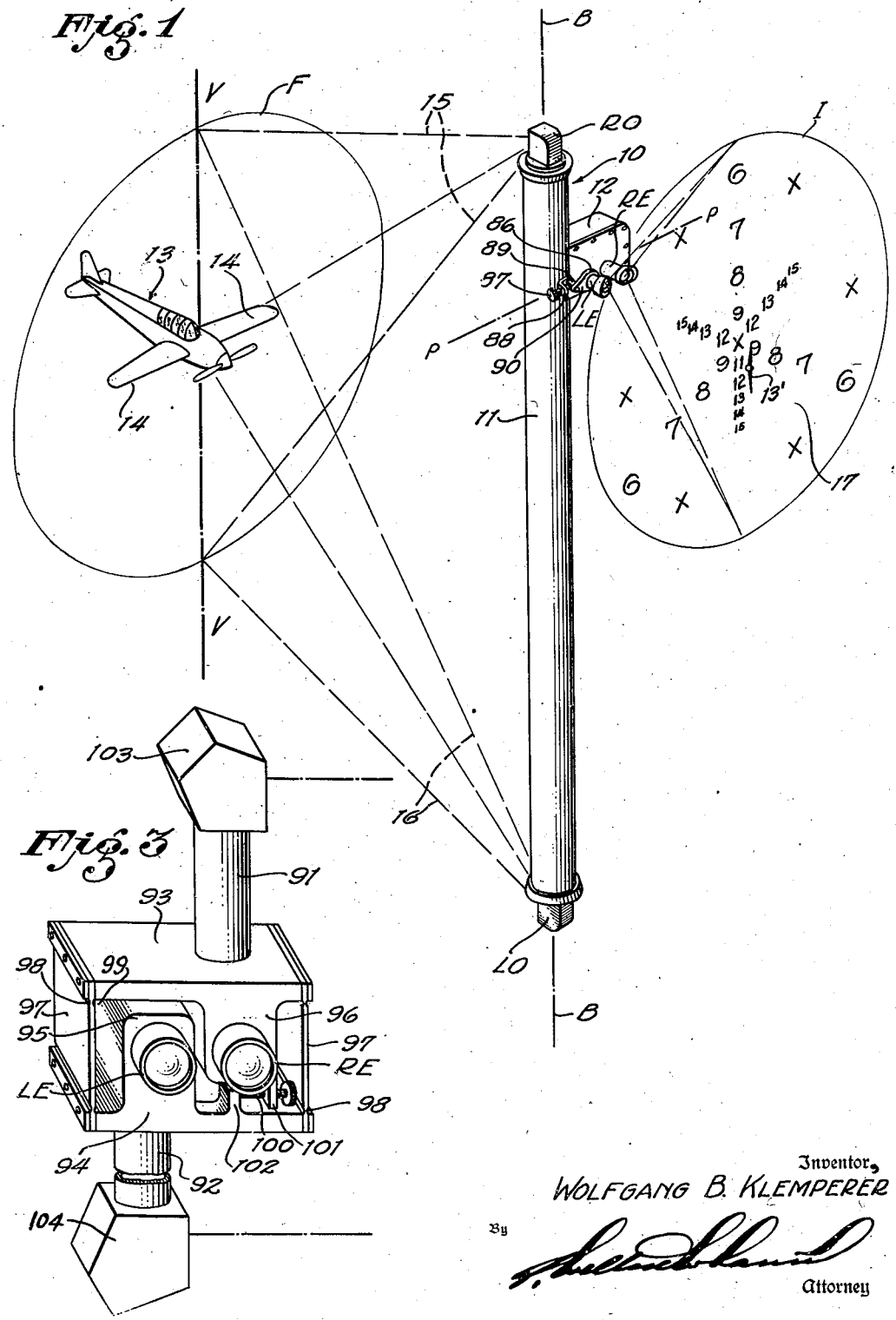

2,358,646

UNITED STATES PATENT OFFICE 2,358,646

STEREOSCOPIC RANGE FINDER WITH VERTICAL BASE

Wolfgang B. Klemperer, Los Angeles, Calif., assignor to Douglas Aircraft Company, Inc., Santa Monica, Calif., a corporation of Delaware Application April 7, 1942, Serial No. 438,050

16 Claims. (Cl. 88—2.7)

This invention relates to range finder devices whereby an observer may determine the distance or range of a certain object or target from the position of the range finder, and the invention comprises improvements important to the art relating to stereoscopic range finders which accomplish determination of the distance of the target object by the stereoscopic effect of binocular vision enhanced by an exaggerated base or pupillary distance.

An object of the invention is to provide a range finder especially suited for determining the distance of aircraft from the location of the range finder. Conventional range finders, as used in connection with naval, coast, and field ordnance, have a serious deficiency when attempt is made to apply the mto modern aerial combat, because of the nature of the target. Modern airplanes are highly streamlined, mostly comprising cantilever monoplanes which in the aspect of pursuit or approach appear like not much more than a horizontal blade, the tapered tips of which do not stand out well enough defined to serve as points of rest or determination for the two eyes of the observer when they fuse the two images in binocular vision. Stereoscopic range finders depend for their successful performance on the phenomenon of depth perception in binocular vision. In the normal position of the human body, with the head erect, the eyes are spaced apart in a horizontal plane, and the optical axes established by the lenses of the eyes lie on opposite sides of a vertically disposed median plane intercepting the object being viewed and the midpoint between the eyes. Owing to the above, depth perception in human vision is the result of horizontal perspective, wherein there is a fusing of a pair of stereoscopic images obtained by eyes spaced on opposite sides of the aforesaid median plane. As the result of this placement of the eyes, depth perception is obtained from those elements of a field of view which have vertical extension and horizontal spacing, such, for example, as trees, poles, walls, people standing erect, etc., and is not obtained from those elements in the field of view which are horizontally extended and vertically spaced, such as telegraph wires, roof tops, bodies of water, the horizon, etc.

The conventional stereoscopic range finder accentuates these depth perceiving characteristics of binocular vision by spreading apart the near ends of the external parts of the two optical axes, this being accomplished by use of two optical systems, one for each eye of the observer, disposed with their field lenses spaced apart in the horizontal plane of the eyes a distance considerably greater than, and generally a multiple of, the spacing of the eyes. The foregoing observations bring out the fact that in conventional range finders of stereoscopic type the entrance pupils of the objective lenses of the two optical systems are spaced parallel to the spacing of the exit pupils. In ordinary use of conventional range finders, the eye pieces and the objective lenses are spaced apart in a horizontal plane, but it is possible to rotate the range finder into some other plane, such, for example, as a vertical plane. However, it is necessary to preserve the relation of the eye pieces and objective lenses, or, in other words, if the range finder is rotated so that its base lies in a vertical plane, the eye pieces and the objective lenses will be spaced in or along a vertical plane, and to use the range finder when vertically disposed would require rotation of the head of the observer to bring his eyes into vertical spaced relation in keeping with the position of the eye pieces of the range finder.

An object of the invention is to provide a range finder of the character described having its base extended along a line disposed at an angle to horizontal, but with the eye pieces thereof spaced apart in a horizontal plane. In disposing the base of the range finder in vertical position, the invention remedies the difficulties found in the use of conventional stereoscopic range finders with modern aircraft as the target or object, and thus makes the stereoscopic range finder principle practically applicable to modern aerial combat. Further objects of the invention are to provide a range finder for combat airplanes affording long range depth perception of a field of target airplanes in pursuit or defense, to increase the accuracy and speed with which an observer may determine the range of a target aircraft in spite of the physical limitations of space available for accommodation of a range finder in his own aircraft.

A further object of the invention is to provide a range finder having a vertical base and horizontally disposed eye pieces wherein the binocular arrangement of the cooperating elements is preserved so that the stereoscopic function of depth perception is fully utilized. This valuable result is achieved by the provision of means for rotating both of the images obtained through the separate optical systems through an angle of substantially 90°. The result of this is that the horizontal target aircraft appears in the vision of the observer to be standing on one wing, but this is not detrimental to the achievement of the purpose of the range finder, which is by use of the stereoscopic phenomenon to determine the distance of the object or target from the observer. It has the advantage of presenting the target airplane wing in fore or aft aspect in such a position that its major extension (namely, its span) appears at right angle to the base and offers a distinct mark for judging the stereoscopic parallax in the conjugated optical systems.

Further objects and advantages of the invention will be brought out in the following part of the specification.

Referring to the drawings, which are for illustrative purposes only,

Fig. 1 is a perspective schematic view showing a preferred embodiment, referred to as type I, of my range finder and illustrating characteristics of it.

Fig. 2 is a perspective diagram showing the optical elements of which the range finder 10 of Fig. 1 is composed.

Fig. 3 is a perspective view of a simple form of my invention wherein the upper and lower legs of the range finger are bodily movable in the direction of the eye distance for the purpose of adjusting the spacing of the eye pieces. This arrangement will be referred to as type Z.

Fig. 4 is a diagrammatic view showing the optical system of the range finder shown in Fig. 3.

Fig. 5 is a diagrammatic view showing the form of my range finder referred to as type D.

Fig. 6 is a diagrammatic view showing the form of my range finder referred to as type T.

Fig. 7 is a diagrammatic view showing the form of my range finder referred to as type Y.

Fig. 8 is a diagrammatic view showing the form of my range finder referred to as type N.

Fig. 9 is a face view of a reticule pattern used in my invention.

In the schematic view, Fig. 1, I have shown a range finder 10 having a tubular housing 11 coinciding with a vertical base B—B. At an intermediate point there is an eye piece housing 12 having a right eye piece RE and a left eye piece LE lying in an ocular plane p—p which is horizontal and therefore at an angle of substantially 90° from the optical plane of the objectives RO and LO, secured respectively at the upper and lower ends of the tubular housing 11. This objective plane is the one in which the objectives RO and LO are spaced and therefore includes the base B—B and any vertical line extending through the center of the field F, such as the line V—V.

In the field F a target airplane 13 is shown. In normal flight, the wings 14 of the airplane extend in a horizontal plane and therefore perpendicular to the vertical line V—V and to the objective plane. As indicated by dotted lines 15 and 16, stereoscopic images of the field F, including the airplane 13, are carried by light rays to the objectives RO and LO. By optical means, which will be hereinafter described, the two stereoscopic images are rotated 90° and are carried to and through the eye pieces LE and RE, and in the vision of the observer form a fused image I wherein the image 13' of the airplane 13 will appear standing on one wing, or perpendicular to the horizontal ocular plane p—p. Also, by use of reticules within the range finder, as will be hereinafter described, distance markers 17 are caused to appear in perspective in the image I, and since the image 13' of the aircraft is derived stereoscopically, it will appear in perspective and to be in apparent depth with reference to markers which will indicate the distance of the plane 13 from the range finder 10.

In Fig. 2 I show a cube 20 to indicate the character of perspective employed, and in this figure and in the following diagrams the elements of the optical system are diagrammatically shown and are not drawn or positioned to scale. In the perspective employed in Fig. 2, lines which extend laterally are shown horizontally as illustrated by the line 21. Vertical lines are extended vertically as indicated at 22 and lines which extend from front to rear and perpendicular to vertical and horizontal lines are shown diagonally as indicated at 23. The stereoscopic image received by the right eye of the observer through the eye piece RE passes from the aircraft 13 along a line 24 to a prism 25 forming a part of the upper objective RO. Below the prism 25 there is an objective lens 26, followed by a reticule 27 having thereon markers 27'. The reticule 27 may be positioned in either the first or the second focal plane, but it is preferably positioned in the focal plane of the objective lens 26, as shown, so as to avoid to the greatest extent any errors resulting from distortion of the housing supporting the other optical members. Below the reticule 27 there is a reflector shown as a mirror 28, diagonally placed so as to receive the image along the line 33 and to transmit the same along the line 34 to a prism 29 arranged to reflect the image rightward along the line 35 through a complement of erecting lenses 30 to a prism 31 which reflects the image downward as indicated by the line 36 and then leftward as indicated by the line 37. A diagonal reflector 32 is placed so as to reflect the image toward the observer along the horizontal line 38 which passes through the eye piece RE. As indicated at 39, the image depicts the aircraft standing on one wing.

The purpose of the roundabout light path is to extend its length to be more commensurable with that of the lower conjugated optical system.

The lower objective LO includes a prism 40 and an objective lens 41, with a reticule 42 in the focal plane of the lens 41. The image of the aircraft 13 is received by the prism 40 along the line 43 and is reflected vertically upward along the line 44 through the lens 41 and reticule 42 and erector lens 130, after which it impinges upon a diagonal reflector shown as a mirror 45. To the right of the mirror 45 there is a diagonal mirror 46, and adjacent the mirror 46 there is a diagonal mirror 47. Above the mirror 47 is another diagonal mirror 48 aligned with the eye piece LE. The mirrors 46, 47, and 48 are arranged so that the image will be carried rightward along the line 50 toward the observer along the line 51, upward along the line 52 and again toward the observer along the line 53 which passes through the eye piece, producing in the left eye of the observer an image 54 which likewise stands on a wing in conjugated relation to the image indicated at 39. It will be understood that these two stereoscopic images are fused in the vision of the observer in the manner described with relation to Fig. 1.

As indicated in Fig. 2, each of the conjugated optical systems may have lamps 80 for illumination of the reticules, these lamps being controlled as to light intensity by use of a rheostat 81 in the supply circuit 82 through which the lamps are energizable. Also, sunshields and filters may be employed in accordance with prior art practices. In all of the forms of my invention, means may be employed to vary the spacing of the eye pieces so as to correspond to the interpupillary distance of the observer. To illustrate this, Fig. 1 shows the eye piece LE supported by a slide 86 arranged to be moved toward and away from the eye piece RE by a screw 87 with threads to engage a bracket 88 and opposite hand threads to engage an internally threaded member 89 connected to the slide 86 by an arm 90. Both the eye piece LE and the mirrors 47 and 48 shown in Fig. 2 swivel about the axis 51 where the eye piece is adjusted for interpupillary distance. For example, when the eye piece LE is swung around the axis represented by the line 51 to the position indicated by dotted lines LE', the mirror 48 will move along the arc 48a to the position 48' and the mirror 47 will rotate on the axis 51 through a like angle as indicated by dotted lines 47'.

In the range finder shown in Figs. 1 and 2, the observer faces toward the target, or as otherwise expressed, the axes of the eye pieces extend nearly parallel to the lines along which light rays travel from the target to the objective openings. In Figs. 3 and 4 I show a simple form of my invention, using a minimum number of optical elements, and so constructed that the observer does not look outward toward the target, but looks laterally and at substantially right angles to the plane defined by the vertical base of the range finder and the target, such plane being vertical during normal horizontal flight of the aircraft.

As shown in Fig. 3, this simple form of the invention includes a relatively short upper tube 91 and a longer lower tube 92. The tubes 91 and 92 are respectively supported by hollow bodies 93 and 94 containing overlapping portions 95 and 96 which support a left hand eye piece LE and a right hand eye piece RE in side by side relation. The bodies 93 and 94 are connected by parallel link means 97 in such a manner that the lateral spacing of the portions 95 and 96, and likewise the spacing of the eye pieces LE and RE, may be varied and the upper and lower tubes 91 and 92 yet maintained with their axes in accurate parallel relation. The parallel link means comprises plates of metal such as spring steel having their upper and lower edges respectively secured rigidly to the lateral extremities of the upper and lower bodies 93 and 94. These plates have channels 98 extending from the front to the rear edges thereof adjacent the points of connection of the members 93 and 94, so as to form relatively thin web portions 99 at which the flexing action will take place when relative lateral movement between the members 93 and 94 occurs. This lateral movement or adjustment is accomplished by means of a screw 100 extending from a lug 101 which projects downwardly from the body 93 to a lug 102 which projects upwardly from the body 94. The upper and lower ends respectively of the tubes 91 and 92 have housings 103 and 104 in which reflectors of the optical system of the range finder are mounted, and other members of the optical system are mounted in the tubes 91 and 92, the housings 93 and 94 and the eye pieces LE and RE, such lens system being shown diagrammatically in Fig. 4.

In the housing 103 at the upper end of the tube 91 there is a reflector, comprising a pentaprism 105 which receives the image of the target 106 along the line 107 and reflects the same downward along the line 108 within the tube to an objective lens 109. The light rays from the lens 109 are received by a simple reflector comprising a triangular prism 110 situated in the housing 93, and by this reflector 110 the light rays are transmitted through a reticule 111 and an eye piece lens 112 mounted in the right eye piece RE. A pentaprism 113 at the lower end of the tube 92 receives the image of the target along a line 114 and reflects the same upwardly along a line 115 within the tube 92. Adjacent the upper end of the tube 92, within the housing 94, there is a reflector in the form of a simple triangular prism 116. Along the line 115 are placed an objective lens 117, a reticule 118 and an erector lens 119. The reflector 116 carries the light rays toward the observer to an eye piece lens 120 mounted within the left eye piece LE. As in the rest of the range finder shown herein, the reticules of Fig. 4 are disposed in focal planes of their respective lens systems and arrangement of the reflectors is such that the images of the target represented diagrammatically at 106' will appear rotated through angles of 90. It will be noted that the upper optical system is short and dispenses with an erector system, yet it presents its image in proper relation to that presented by the longer lower optical system which contains such an erector system.

In the form of range finder shown in Fig. 5, referred to as type D for the reason that it employs dove prisms therein, the optical systems leading respectively to the left and right eye are composed of the same elements, in reversed or antisymmetrical position. The lower leg of the range finder shown in Fig. 5 has an objective mirror to receive the image along a line 55 and to reflect this image upward along the vertical line 56 to the mirror M' which reflects the image forwardly along line 57 through the eye piece E. Adjacent the mirror M there is an objective lens F, followed by a reticule R. Erecting lenses L and L' are employed, and between them a dove prism D is placed and is disposed at an angle of 45° with respect to the plane defined by the lines 55 and 56, thereby rotating the image through an angle of 90°. In a similar manner but in reversed or antisymmetrical position, the upper optical system of the range finder receives the image along a line 58, and by the mirror M², objective lens F², erecting lenses L² and L²', dove prism D², mirror M²', and eye piece E', the image is carried along the lines 59 and 60 to the right eye of the observer. The reticule R² is preferably placed in the focal plane of the objective lens F². The dove prism D² is rotated in the opposite direction from the dove prism D to give the same rotation of the target's image through an optical system disposed in reversed position to the optical system which has therein the dove prism D.

The dove prism acts as a third mirror in the light path of each leg of the range finder. The images are therefore mirror images in which the designations right and left have the opposite co-ordinations with up and down to that in the real field. This, however, is not considered objectionable because the images appear to be standing on a wing anyhow. To facilitate identification of right and left in communication with observer and pilot, a small r and l may be engraved in the top and bottom parts of the reticule. The same expedient may be resorted to in the following two types which also present mirror images.

The range finder shown in Fig. 6 is very similar to the range finder shown in Fig. 5 but avoids use of the dove prisms D and D², replacing these dove prisms by two additional mirrors arranged in cooperation with other mirrors to produce the required image rotation. This range finder has downwardly and upwardly extending legs represented by the vertical lines 62 and 63. At the outer ends of the legs, or, in other words, the lower and upper ends thereof, the mirrors M and M² are placed. Along the lower leg 62 are arranged the optical members F, R, L, and M', and along the upper leg are arranged the optical members F², R², L², and M²'. The mirrors M' and M²' are diagonally placed with relation to the legs 62 and 63 so that the images will be reflected at right angles to the legs, and, in addition, these mirrors M' and M²' are rotated bodily around the axes represented by the legs 62 and 63 so as to reflect the images laterally along the horizontal lines 64 and 65, the images then being reflected along forwardly extending lines 66 and 67 by mirrors M" and M²". The images brought to the eyes of the observer through the eye pieces E and E² are identical except for the stereoscopic parallax. It should be understood that the term "forwardly" herein refers to the direction of travel of light rays from the target to the eye of the observer.

The range finder shown in Fig. 7 differs very slightly from the one shown in Fig. 6. It takes advantage of the fact that the hypotenuse is shorter than the sum of the two remaining sides or a right angled triangle, and to make the vertical dimension of the range finder as short as may be required by space limitations of the aircraft, and yet have room for the optical elements, the upper and lower legs of the range finder are sloped forward. Accordingly, in Fig. 7, the legs 62 and 63 of the arrangement shown in Fig. 6 are sloped forward as indicated at 62' and 63' in Fig. 7. In order to obtain a 90° image rotation, it is necessary to swing the lines 64 and 65 from the positions in which they are shown in Fig. 6. As shown at 64' and 65', in Fig. 7, these lines of reflection between the mirror M' and M" and M²' and M²" instead of being aligned, slope forwardly in a horizontal plane toward the position of the observer.

In the previously described form of my invention, the optical axes of the eye pieces are parallel to the line of sight to the target, so that the observer looks in the same direction as the objectives of the range finder. In the form of the invention shown in Fig. 8, it is arranged that the observer looks into the eye pieces in a lateral direction, these eye pieces being disposed sideways with respect to the plane defined by the objectives, thus accomplishing a 90° rotation of the field without an odd mirror in either leg of the range finder and without use of dove prisms. The image, therefore, will appear right-side-to as though merely rotated and not mirror-reflected. This, however, does not accomplish a saving in mirrors, for the reason that two additional mirrors are required in one of the legs to bring the images to the observer at the same rotation instead of oppositely rotated. Referring to Fig. 8, the observer looks into the eye pieces E and E² so that the images are brought to his eyes along the horizontal lines 70 and 71. However, the lines 72 and 73 along which the light travels from the target aircraft 13 to the objective mirrors M and M², extend nearly horizontally in a vertical plane which is perpendicular to the eye piece axes 70 and 71. The mirror M at the lower leg receives the image along the line 72 and reflects the same upwardly along the line 74. The mirror M' at the upper end of the line 74 is diagonally disposed so as to reflect the image along the line 70 which lies in a horizontal plane, and is also rotated on the axis defined by the line 74, the rotation of the mirror M' causing rotation of the image as indicated at 13'. The other leg of the range finder, namely, the upper leg, has mirrors M² and M²' corresponding to the mirrors M and M', but in order to give proper rotation of the image transmitted by the upper leg of the range finder, it is necessary to employ the two additional reflective members m and m'. The mirror M²' is positioned so as to reflect the image along the line 75 which is nearly parallel to the line of inception 73. The mirror m reflects the image upwardly along the line 76, and the mirror m' reflects the image along the line 71 through the eye piece E².

In Fig. 9 I show reticules 27 and 42 comprised of discs of transparent material having the markers 17 thereon. These reticules are substantially identical, differing only in the horizontal displacements of the numbered markers 17 from the vertical center lines a—a thereof. To illustrate this, I have in Fig. 9 diagrammatically shown a distance t separating the upper ends of the axes a—a, and the distance b, slightly greater than the distance t, separating the lower ends of the axes a—a. In the preparation of these reticules, the markings 17 are graphically or mathematically laid out to very large scale and then are photographically reduced to proper finally usable size. As indicated at 120, a centrally disposed X is employed to indicate a distance of 10 units from the observer, and a number of the markings X are distributed in a pattern around the center of the reticule, as indicated at 121, at their properly computed lateral parallax displacements.

In each reticule 27 and 42, in addition to the marks X, there are three systems of marks, each of which includes characters referring to distances nearer and farther than the apparent distance of 10 units. One of these systems, indicated at 122, is disposed nearly along the vertical center line a—a. Another system, 123, comprises indicating characters disposed along a line which passes through the center of the reticule and slopes upwardly from left to right. The third system of marks, 124, is disposed along a line sloping upwardly from right to left and passing through the center indicated by the character X of the system 122. In the system, the large numerals 6 to 9 represent distances of six hundred to nine hundred units, and the smaller numerals, 11, 12, 13, 14, and 15, represent the distances eleven hundred, twelve hundred, thirteen hundred, fourteen hundred, and fifteen hundred units. In the use of the range finder, the pattern of the reticules in the fused image brought to the observer, as indicated in Fig. 1 at 17, appears to be standing out in space, with the characters of the reticule image at the distances from the observer which the respective characters represent. When a target appears in the image brought to the vision of the observer, comparison of its distance with the apparent distances of the markings of the recticules will enable the observer to judge the distance of the target from the range finder with practical accuracy. Each of the reticules set forth in the disclosure has characteristic features such as described in the foregoing several paragraphs.

I claim my invention:

1. In a range finder for binocular viewing of a field, the combination of: means establishing a base for the range finder; objectives near the ends of said base to receive light from said field; a pair of eye pieces in an ocular plane disposed at an angle to said base; and optical means to carry images of said field from said objectives to said eye pieces and to rotate said images through an angle corresponding substantially to the angle of said ocular plane to said base.

2. In a range finder for binocular viewing of a field, the combination of: means establishing a vertical base for the range finder; objectives near the ends of said base to receive light from said field; a pair of eye pieces in a horizontal ocular plane disposed at an angle to said base; and optical means to carry images of said field from said objectives to said eye pieces and to rotate said images through an angle of substantially 90°.

3. In a range finder for binocular viewing of a field, the combination of: means establishing a base for the range finder; objectives near the ends of said base to receive light from said field; a pair of eye pieces in an ocular plane disposed at an angle of substantially 90° to said base; optical means to carry images of said field from said objectives to said eye pieces and to rotate said images through an angle of substantially 90°; and means enabling the observer to gauge the apparent parallax of a target appearing in the field of view of the range finder.

4. In a range finder for binocular viewing of a field, the combination of: means establishing a base for the range finder; objectives near the ends of said base to receive light from said field; a pair of eye pieces in an ocular plane disposed at an angle of substantially 90° to said base; optical means to carry images of said field from said objectives to said eye pieces and to rotate said images through angles of substantially 90°; and reticule means in the focal plane of at least one pair of said optical means to bring into said images a system of range marks by which the apparent parallax of a target appearing in said field may be gauged.

5. In a range finder for binocular viewing of a field, the combination of: means establishing a base for the range finder; objectives near the ends of said base to receive light from said field; a pair of eye pieces in an ocular plane disposed at an angle to said base; optical means to carry images of said field from said objectives to said eye pieces and to rotate said images; means to adjust the interpupillary distance between said eye pieces; and a pair of parallactically conjugated reticules.

6. In a range finder for binocular viewing of a field, the combination of: means establishing a base for the range finder; objectives near the ends of said base to receive light from said field, said objectives defining an objective plane; a pair of eye pieces in an ocular plane disposed at an angle to said base and at an angle to said objective plane; optical means to carry images of said field from said objectives to said eye pieces and to rotate said images; and a pair of parallactically conjugated reticules.

7. In a range finder for binocular viewing of a field, the combination of: means establishing a base for the range finder; objectives near the ends of said base to receive light from said field, said objectives defining an objective plane; a pair of eye pieces in an ocular plane disposed at an angle of approximately 90° to said base and at an angle of approximately 90° to said objective plane; optical means to carry images of said field from said objectives to said eye pieces, said optical means having parts to rotate said images through angles of approximately 90°; and a pair of parallactically conjugated reticules.

8. In a range finder for binocular viewing of a field, the combination of: means establishing a vertical base for the range finder; objectives near the ends of said base to receive light from said field; a pair of eye pieces in a horizontal ocular plane disposed between said objectives and closer to the upper of said objectives than to the lower; optical means to carry images of said field from said objectives to said eye pieces, said optical means having parts to rotate said images through an angle of substantially 90°; and a pair of parallactically conjugated reticules.

9. In a range finder for binocular viewing of a field, the combination of: means establishing a vertical base for the range finder; objectives near the ends of said base to receive light from said field; a pair of eye pieces in a horizontal ocular plane disposed at an angle to said base; and optical means to carry images of said field from said objectives along said base to said ocular plane, then laterally and rearwardly to said eye pieces, said optical means including parts to rotate said images through angles of substantially 90°.

10. In a range finder, the combination of: a pair of eye pieces disposed in side by side relation in an eye piece plane; a pair of optical systems, each being arranged to bring a target image to one of said eye pieces; separate supporting means for each of said optical systems and its associated eye piece; parallel link means connecting said supporting means for parallel relative bodily movement in a direction to change the distance between said eye pieces; and adjustment means for causing said relative movement of said supporting means.

11. In a range finder, the combination of: a pair of eye pieces disposed in side by side relation in an eye piece plane; a pair of optical systems, each being arranged to bring a target image to one of said eye pieces; separate supporting means for each of said optical systems and its associated eye piece; parallel link means connecting said supporting means for parallel relative movement in a direction to change the distance between said eye pieces, said link means comprising a pair of plate members with the end portions thereof connected to said supporting means, said plate members being thinned near the ends thereof so that they will be more flexible at such points than intermediate the ends thereof and so that when said supporting means are moved together or apart, principal flexure of said plate members will occur at said thinned portion thereof; and adjustment means for causing said relative movement of said supporting means.

12. In a range finder for binocular viewing of a field, the combination of: means establishing a vertical base for the range finder; objectives near the ends of said base to receive light from said field; a pair of eye pieces in a horizontal ocular plane disposed between said objectives and closer to the upper of said objectives than to the lower; optical means to carry images of said field from said objectives to said eye pieces, said optical means having parts to rotate said images through an angle of substantially 90°, and having one less erector lens system in the upper than in the lower of two conjugated optical systems; and a pair of parallactically conjugated reticules.

13. In a range finder for binocular viewing of a field, the combination of: means establishing a vertical base for the range finder; objectives near the ends of said base to receive light from said field; a pair of eye pieces in a horizontal ocular plane disposed between said objectives and closer to the upper of said objectives than to the lower; optical means to carry images of said field from said objectives to said eye pieces, said optical means having parts to rotate said images through an angle of substantially 90°, and having more reflectors in the shorter upper than in the longer lower of two conjugated optical systems; and a pair of parallactically conjugated reticules.

14. In a range finder the combination of: a pair of eye pieces disposed in side by side relation in an eye piece plane; a pair of reflectors disposed one a shorter distance above one of said eye pieces, the other a longer distance below the other of said eye piece, each adapted to receive an image of the distant field lying to one side of the observer; optical means to carry each of said field images in a rotated orientation to one of said eye pieces respectively; and means to gauge the parallax of distant field objects.

15. In a range finder, the combination of: a pair of elongated supports, each having an eye piece end and an objective end, said supports being disposed so as to lie in spaced parallel planes and said eye piece ends being in side by side relation; an optical system carried by each of said supports comprising an objective, an eye piece and optical means for transmitting an image from said objective to said eye piece; and parallel motion mechanism holding said supports in parallel relation and permitting bodily movement thereof together and apart whereby the distances between said eye pieces may be varied.

16. In a range finder, the combination of: a pair of eye pieces disposed in side by side relation in an eye piece plane; a pair of optical systems, each being arranged to bring a target image to one of said eye pieces; separate supporting means for each of said optical systems and its associated eye piece; and means connecting said supporting means for relative bodily movement together and apart so as to change the distance between said eye pieces while at the same time holding said supporting means and the optical systems thereof in cooperative relation.

WOLFGANG B. KLEMPERER.